March 1, 1949.
G. L. HERVERT ET AL
2,463,036
SEPARATION OF CYCLIC OLEFINS FROM
STRAIGHT CHAIN OLEFINS
Filed Dec. 1, 1945
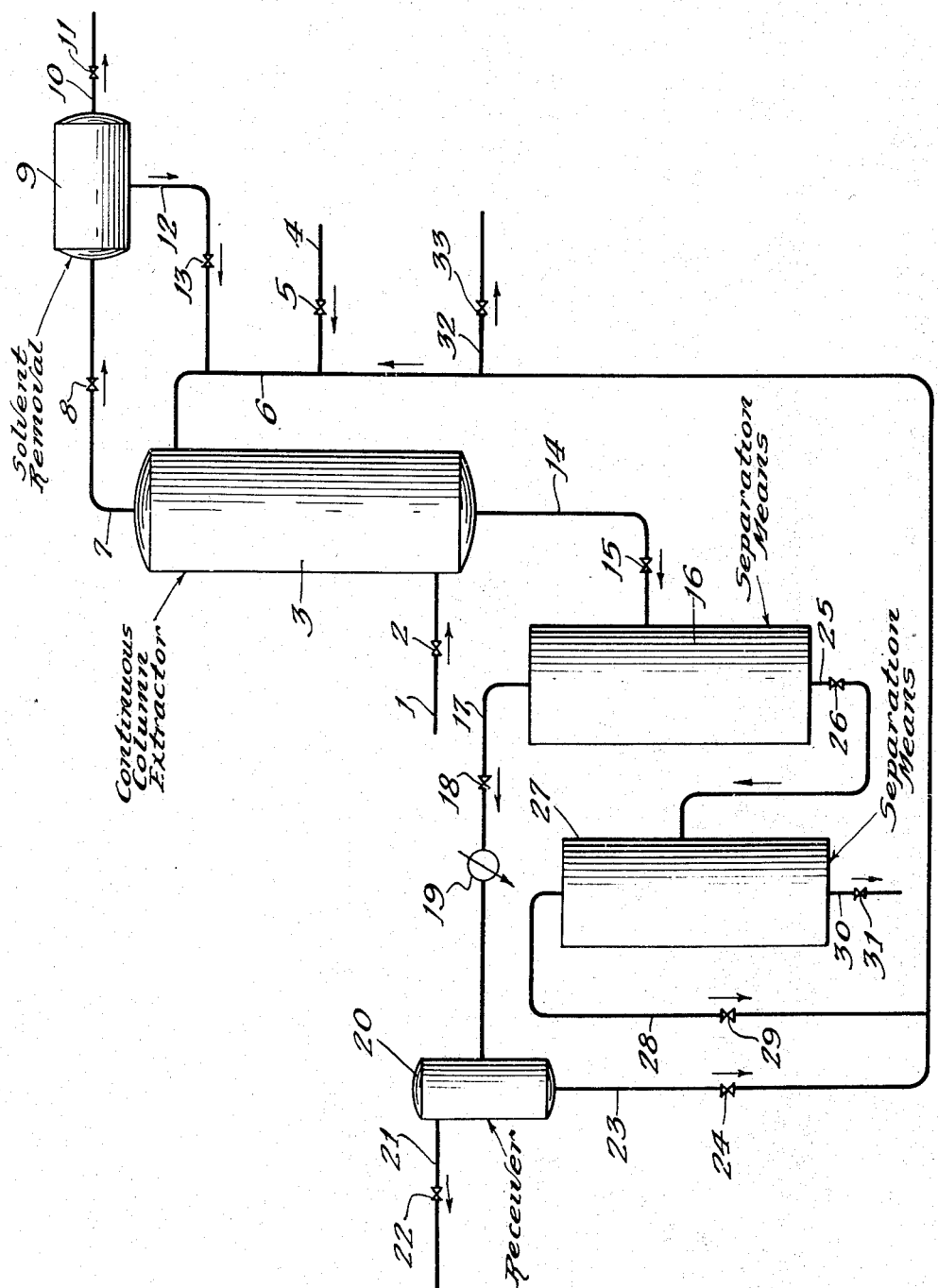
Inventors:
George L. Hervert
Maurice J. Murray
By: Maynard P. Venema
Attorney

UNITED STATES PATENT OFFICE 2,463,036

SEPARATION OF CYCLIC OLEFINS FROM STRAIGHT CHAIN OLEFINS

George L. Hervert, Berwyn, and Maurice J. Murray, Clarendon Hills, Ill., assignors to Universal Oil Products Company, Chicago, Ill., a corporation of Delaware Application December 1, 1945, Serial No. 632,212

5 Claims. (Cl. 260—666)

This invention relates to a process for separating cyclic olefins such as 1-methylcyclopentene-1, 1-methyl-2-ethylcyclohexene-1, 1,3,5-trimethylcyclohexene-1, and the like, from hydrocarbon mixtures. More particularly, it deals with the separation of open-chain and cyclic olefins from hydrocarbon mixtures containing the same by subjecting said mixtures to solvent extraction with an aqueous solution of a glycol-derivative solvent.

Hydrocarbon mixtures of a complex nature are produced in various petroleum cracking processes and in other ways. In order to utilize to the best advantage certain components of such mixtures, it frequently is desirable to isolate and recover these components in a substantially concentrated form. Thus, for instance, cracked gasolines or narrow-boiling fractions thereof, which are produced in petroleum refining operations, may advantageously be processed in such a manner as to produce a fraction rich in open-chain olefins that is suitable for conversion to certain chemical intermediates and a fraction rich in cycloolefins that is suitable for use in the preparation of certain other derivatives.

We have discovered that by the use of a particular type of solvent, an efficient and economical separation can be effected between the cyclic and open-chain olefins.

In one embodiment our invention consists of a process for removing cycloolefins from a hydrocarbon mixture containing said olefins which comprises contacting the mixture with an aqueous solution of a glycol-derivative solvent and recovering the treated hydrocarbons.

In a more specific embodiment our invention consists of a process for separating cyclic olefins from open-chain olefins which comprises contacting a liquid hydrocarbon mixture containing said olefins with an aqueous solution of a glycol-derivative solvent containing less than 50% water under conditions to form two phases, and recovering a substantial portion of the open-chain olefins in the raffinate phase and a substantial portion of the cyclic olefins in the extract phase.

Solvents which may be used in the process of our invention comprise aqueous solutions of glycol derivatives. Water must be a component of the solvent because, as will hereinafter be shown, extraction of olefin-containing hydrocarbon mixtures with anhydrous glycol derivatives does not remove cycloolefins. The preferred solvents include the aqueous solutions of the ethers and esters of ethylene glycol and of diethylene glycol. The ethers of ethylene glycol include methyl Cellosolve (ethylene glycol monomethyl ether), Cellosolve (ethylene glycol monoethyl ether), 2-ethyl butyl Cellosolve (ethylene glycol ethyl butyl ether), and phenyl and benzyl Cellosolves. The ethers of diethylene glycol include methyl Carbitol (diethylene glycol monomethyl ether), Carbitol (diethylene glycol monoethyl ether), and butyl Carbitol. The esters include methyl Cellosolve acetate, butyl Carbitol acetate, glycol diacetate, and glycol diformate. The water content of the aqueous solutions may be from about 2 to about 50%; the preferred range is from about 4 to about 12%.

In general the charge stock to our process may be any hydrocarbon fraction that contains cyclic olefins; for extraction of such stocks with the solvents herein mentioned effectively removes the cycloolefins. However, our process has the greatest application in the separation of cyclic and open-chain olefins from complex mixtures of the same. Such mixtures are usually found in cracked gasolines obtained in the thermal or catalytic cracking of high-boiling hydrocarbon fractions such as gas oil, topped crude, and reduced crude, and the gasoline boiling range products obtained in the thermal and catalytic reforming of thermal and straight-run gasolines and naphthas. Full-boiling range cracked gasolines may be charged to our process but it frequently is desirable to use selected narrow-boiling fractions thereof.

The process of the present invention may be carried out in either batch or continuous types of operation. The simplest method of batch operation is to bring the entire quantities of solvent and feed to be extracted together in one contact and then recover the products and the solvent without further extraction. A more efficient method is to divide the total quantity of solvent into several portions and then treat the feed with each of these portions of fresh solvent in a series of successive steps or stages, that is, the raffinate from the first extraction stage is treated with fresh solvent in a second stage, etc. It usually is preferable to carry out this process on a continuous basis such as by countercurrent multiple contact. In this method all of the fresh solvent and feed are sent to opposite terminals of a series of extraction stages. Extract and raffinate layers pass continuously and countercurrently from stage to stage through the system. The finished extract and raffinate layers are withdrawn continuously from opposite ends of the system. Any number of stages may be employed, the more usual number being from 3 to 6. This system may be composed of a series of mixers each with separate settlers or some form of continuous plate, packed, or spray column may be used.

The accompanying diagrammatic drawing illustrates one specific form of apparatus in which the process of the invention may be conducted.

Referring to the drawing, a hydrocarbon feed stock such as 180–220° C. cracked gasoline, which contains open-chain and cyclic olefins, is passed through line 1 containing valve 2 and into extractor 3 near the bottom. This extractor may be a plate, packed, or spray column, or any other type of column in which continuous counter-current contact between the hydrocarbon feed and the solvent may be maintained. Fresh solvent, which comprises an aqueous solution of methyl Cellosolve containing 6% of water, is charged as needed through line 4 containing valve 5 into line 6, and is passed into extractor 3 near the top. The solvent flows downwardly through the extractor and removes the cyclic olefins from the upwardly flowing hydrocarbons. The raffinate, which contains most of the open-chain olefins charged to the process but which is substantially free from cyclic olefins, leaves extractor 3 through line 7 containing valve 8, and is passed into solvent removal means 9 wherein a separation is effected between the dissolved solvent and the hydrocarbons. The solvent-free hydrocarbons leave means 9 through line 10 containing valve 11. The recovered solvent leaves the solvent removal means 9 through line 12 containing valve 13 and passes into extractor 3. The extract phase, which comprises used solvent, cycloolefins, and aromatics, together with small quantities of other types of hydrocarbons, is withdrawn from extractor 3 through line 14 containing valve 15, and is passed into separation means 16, which usually consists of a fractional distillation column. The hydrocarbons of low refractive index and substantially all of the water are taken overhead from means 16 through line 17 containing valve 18, and passed through condenser 19 into receiver 20. The hydrocarbons and the water separate into two phases in receiver 20. The hydrocarbons are withdrawn through line 21 containing valve 22. The water is withdrawn through line 23 containing valve 24, and is recycled to extractor 3. The water-free methyl Cellosolve, containing the bulk of the cycloolefins and aromatics, is withdrawn from separation means 16 through line 25 containing valve 26 and is charged to separation means 27, which usually is a fractionator. Methyl Cellosolve is removed overhead from means 27 through line 28 containing valve 29, and is recycled, together with the water from receiver 20, to extractor 3. Solvent-free cycloolefins and aromatics are withdrawn through line 30 containing valve 31. It is to be understood that the method of recovering the hydrocarbons from the extract phase can be varied as necessitated by the boiling point and other physical properties of the hydrocarbon and the solvent. Used solvent may be withdrawn from the system through line 32 containing valve 33.

The following examples are given to illustrate our invention but are not intended to unduly limit the generally broad scope of said invention.

*Example I*

A quantity of 182–223° C. Trinidad pressure distillate was shaken with an equal volume of anhydrous methyl Cellosolve at room temperature. After the extract and raffinate layers were definitely established, the layers were separated, washed with water, and a refractive index taken. Fifty-four per cent of the hydrocarbons charged ended up in the extract layer, which had a refractive index of 1.4880. This is to be compared with the 1.4829 refractive index of the charge stock. Other analytical tests showed that there had been no separation effected between the cycloolefins and the open-chain olefins.

*Example II*

The experiment given under Example I was repeated with an aqueous solution of methyl Cellosolve in which the water content was 7.4 weight per cent. In this case only 16.8% of the hydrocarbons charged appeared in the hydrocarbon extract phase which had a refractive index of 1.5141. Further tests showed that the concentration of the cycloolefins in the extract phase was greater than the concentration in the charge. Similar tests showed that the concentration of open-chain olefins was higher in the raffinate than in the charge.

*Example III*

A 187–218° C. fraction of Trinidad pressure distillate was subjected to 17 successive extractions with approximately 10 times its volume of aqueous methyl Cellosolve at 23° C. The total amount of hydrocarbon charged was 2320 ml. and the amount of solvent used as 24455 ml. The water content of the solvent was 7.4%. The results are summarized in the following table.

| | Charge | Hydrocarbon Raffinate | Hydrocarbon Extract |
|---|---|---|---|
| Vol., Ml | 2,320 | 1,515 | 782 |
| Spec. Gr. @ 60° F | 0.8607 | 0.8265 | 0.9218 |
| $n_D^{20}$ | 1.4790 | 1.4554 | 1.5202 |
| Boiling Range, ° C | 187–218 | 186–218 | 197–234 |
| Bromine No | 23 | 25 | 20 |
| Olefins Wt., Per cent, By Br. No | 26 | 28 | 22 |
| Aromatics Wt. Per cent, By Pulfrich | 51 | 14 | 72 |

The raffinate was light colored liquid whereas the extract exhibited a dark coloration.

A 40 cc. sample of the raffinate was subjected to fractional adsorption over silica gel. Ten equal volume cuts were obtained. The first 6 cuts contained only saturated hydrocarbons. Cuts 7 and 8 contained open-chain olefins of the type R—CH=CH$_2$(I) and R—CH=CH—R'(II). The demonstration of the presence of these types of oelfins was made by use of infra-red absorption spectra methods. Prominent bands known to be due to alkene-1 (type I) are near 1830, 1640, 990, and 905 cm.-1 with the last being the most powerful. Alkenes of type II, absorb strongly at 965 cm.-1. These characteristic bands appeared strongly in the spectra of the cuts 7 and 8 from the adsorption run. The last cuts showed these bands to be weaker and those characteristic of aromatic compounds and other types of olefins to be stronger.

A 40 cc. sample of the extract was also subjected to fractional adsorption over silica gel and again ten equal-volume cuts were obtained. The infra-red absorption spectrum of the first cut showed the presence of a high concentration of aromatics and only small amounts of olefins of the R—CH=CH$_2$ and R—CH=CH—R' types. Since these types of olefins appear in the adsorption tower effluent ahead of other types of olefins and aromatic compounds, the near absence of the olefins of types I and II and the presence of large amounts of aromatics shows that the separation of olefin types was good. This was confirmed by the analyses of later cuts which were found to contain appreciable quantities of cyclic olefins.

We claim as our invention:

1. A process for separating cycloolefins from open-chain olefins which comprises contacting a hydrocarbon mixture containing said olefins with an aqueous solution of ethylene glycol monomethyl ether containing from about 4% to about 12% by weight of water under conditions such that two liquid phases are formed, separating a raffinate phase comprising said open-chain olefins, and separating an extract phase comprising said cycloolefins.

2. A process for separating cycloolefins from open-chain olefins which comprises contacting a hydrocarbon mixture containing said olefins with an aqueous solution of ethylene glycol monomethyl ether containing from about 4% to about 12% by weight of water under conditions such that two liquid phases are formed, separating a raffinate phase comprising open-chain olefins of the type R—CH=CH$_2$ and R—CH=CH—R', and separating an extract phase comprising said cycloolefins.

3. A process for separating cycloolefins from open-chain olefins which comprises contacting a hydrocarbon mixture containing said olefins with an aqueous soltion of ethylene glycol monomethyl ether containing from about 4% to about 12% by weight of water under conditions such that two liquid phases are formed, separating a raffinate phase comprising said open-chain olefins, separating an extract phase comprising said cycloolefins, subjecting said extract phase to fractional distillation to separate water from a residue comprising said ether and said cycloolefins, and subjecting said residue to further fractional distillation to separate sa_d ether from said cycloolefins.

4. The process of claim 3 further characterized in that said water is returned to said contacting step.

5. The process of claim 3 further characterized in that the ether separated in said last-named fractional distillation step is returned to said contacting step.

GEORGE L. HERVERT.
MAURICE J. MURRAY.

REFERENCES CITED

The following references are of record in the file of this patent:

UNITED STATES PATENTS

| Number | Name | Date |
|---|---|---|
| 1,908,018 | Henderson | May 9, 1933 |
| 2,087,455 | Stratford | July 20, 1937 |
| 2,176,746 | Pokorny et al. | Oct. 17, 1939 |
| 2,243,873 | Lyman | June 3, 1941 |
| 2,414,252 | Ashburn | Jan. 14, 1947 |

OTHER REFERENCES

Francis: Jour. Ind. Eng. Chem., vol. 36, 764–771 and 1096–1104 (1944).